Oct. 11, 1938.  H. COOPER  2,132,399
LEATHER CEMENTED ARTICLES
Filed April 1, 1936    2 Sheets-Sheet 1

INVENTOR.
Himen Cooper
BY
ATTORNEY.

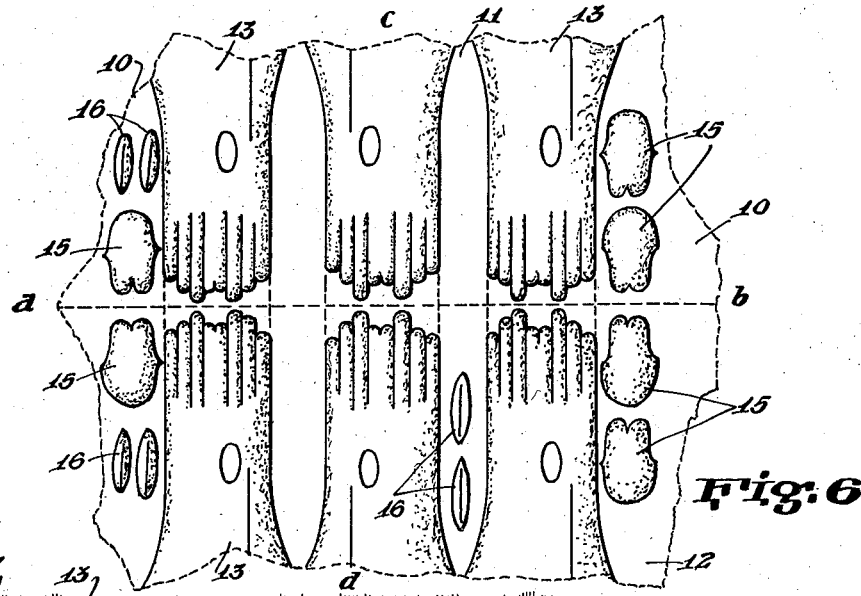
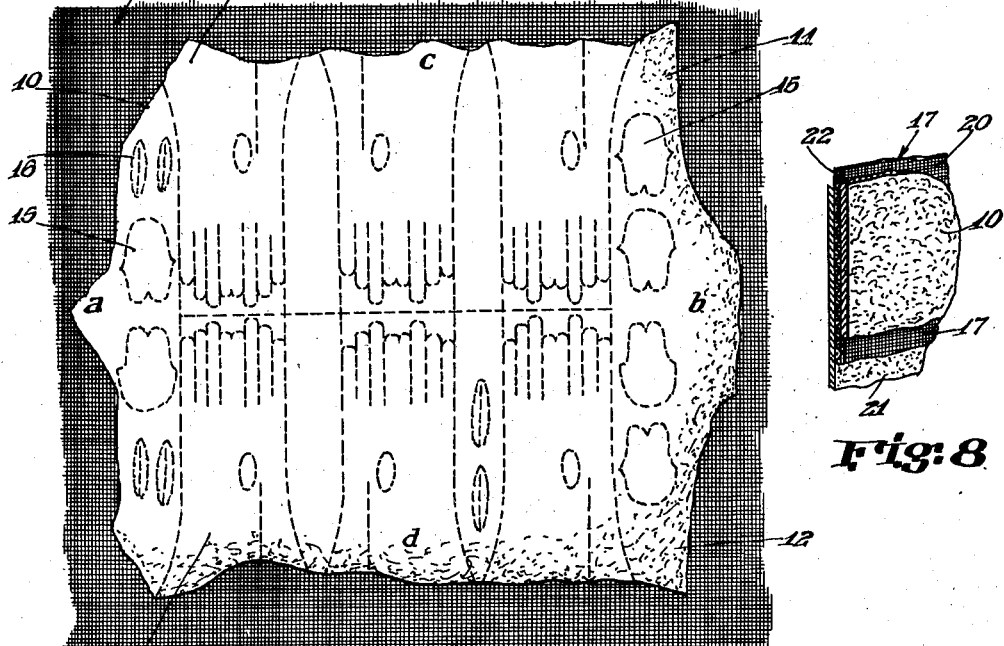
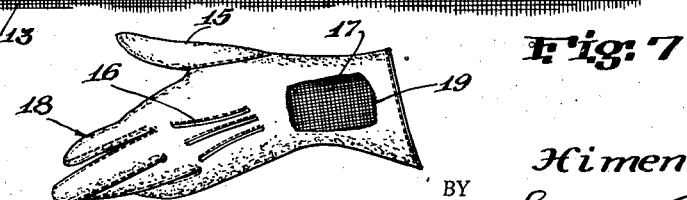

Patented Oct. 11, 1938

2,132,399

UNITED STATES PATENT OFFICE 2,132,399

LEATHER CEMENTED ARTICLES

Himen Cooper, Brooklyn, N. Y.

Application April 1, 1936, Serial No. 72,123

6 Claims. (Cl. 154—2)

My invention relates to novel leather products and the methods of making the same, and more particularly, relates to novel leather compositions and the process for making the same.

The softness, "feel" or "break" of leather particularly adapts it for many uses, as for example, for wearing apparel such as gloves, shoes, slippers and coats. In increasing the strength of the leather, it is essential that its "feel" should not be destroyed. Fabric linings have been applied to leather but in all of these cases the resulting product was stiff and hard, the leather losing its softness or "feel". Moreover, in combining it, the leather lost its property of "stretch". For these reasons such combinations of material could not be used for wearing apparel.

I have discovered that by employing a cement that is free of fillers or foreign matter normally causing cement to become stiff or hardened when dry, i. e., by utilizing cement in a highly pure state, it remains soft after being dried, while at the same time providing all of the necessary adhering properties. I have further discovered that by applying this cement in a fine spray so that it is atomized and uniformly distributed in an extremely thin film over the leather surface to be cemented with the fabric, so that the individual globules of the cement are prevented from coagulating with each other to form a hard stiff substance, the ultimate product retains the softness, "feel" and break of the original leather. The product of leather combined with fabric is stronger and "warmer" than leather alone.

Moreover, I have discovered that by the use of a cloth specifically woven to provide a stretch in one direction that I can obtain a predetermined stretch in the composite cloth and leather.

Accordingly, an object of my invention is to provide novel leather products and processes of making the same.

Another object of my invention is to provide a construction of leather and fabric applied with a non-hardening cement in a novel manner so as to retain the softness, feel and break of leather.

A further object of my invention is to provide a novel fabric reinforcement to leather and retain the original softness of the leather.

In the manufacture of products from skins, it is often desirable to employ what is known as suede skins, that is, a skin surfaced only with the flesh part of the dermis. Suede leather is obtained by splitting off the exodermis or fine thin skin surface from the flesh part. The exodermis, particularly in the case of sheep skins, goat skins and the like, and also of cow hides in some cases, is so thin and weak that it tears readily.

I have discovered that by applying a reinforcing product such as fabric, cloth and the like to the skivers of sheep skins, goat skins and the like, or to buffings of cow hides, I can produce a final product which has the pleasant appearance of leather, has its feel, break and softness, and for all practical purposes has the same strength and, in fact, may be made even stronger, than leather. Moreover, because of its increased strength, this composite material can be sewed on sewing machines whereas the original skivers are too weak to be so treated.

Accordingly, an object of my invention is to provide a novel composition of skivers or buffings with a reinforcement therefor.

A further object of my invention is to provide a novel leather product.

Still another object of my invention is to provide a novel composition of skivers and buffings of predetermined strength.

It is interesting to note that the art of manufacturing gloves, one of the oldest of the modern day arts, contains many archaic principles which have now been outmoded in most other modern industries.

Reduced to its elements, the art of manufacturing gloves resides in cutting the gloves to such dimensions that when they are slipped on the hand of the user, they will stretch just enough to snugly encase the hand. To this end, the glove cutter must first, by stretching the skins from which he is to make the glove, and through his sense of feel, determine the particular stretching qualities of that particular skin and from that sense of feel determine the extent of stretch in the leather, and therefore the dimensions to which the leather must be cut for a particular size of glove.

Heretofore, no machine has been developed which can take the place of the "feel" which the glove cutters obtain in stretching the skin for determining its stretch, and accordingly, the manufacture of gloves continues as an individual art. There are three distinct methods of cutting gloves, namely, table cutting, pull-down cutting, and block cutting. Of these the most skillful and the one providing the finest fitting gloves is the table cutting method. Quoting from the N. Y. State Department of Labor, Bureau of Labor Statistics, 1908, Part 1, page 155:

"* * * To acquire the skill necessary for 'table cutting of gloves' a three year apprenticeship is required and even after that, only about one cutter in three is really a first class worker."

In accordance with my invention, I contemplate applying a cloth to the leather in the novel method referred to above, the fabric or cloth having a predetermined stretch so that when it is applied to the leather, it will permit the leather to stretch only the same predetermined amount, thus making it possible to predetermine the exact stretch of leather, eliminating the human element and greatly reducing the time in the manufacture of gloves.

Accordingly, a further object of my invention is to provide novel gloves and novel methods of making the same.

A further object of my invention is to provide a leather composition having a predetermined stretch.

There are other objects of my invention which together with the foregoing, will appear in the following description in connection with the drawings, in which:

Figure 6 illustrates the distribution of the skin into the various glove tranks and the parts of the gloves, such as the thumbs and fourchettes.

Figure 7 is a plan view of the leather with my preferred fabric applied thereto as it is to be cut into gloves.

Figure 8 shows a modification wherein a further layer of soft leather is bonded to the other side of the fabric.

Figure 9 is a completed glove manufactured according to my invention, with a portion broken away to show the bonded fabric.

Figure 1:
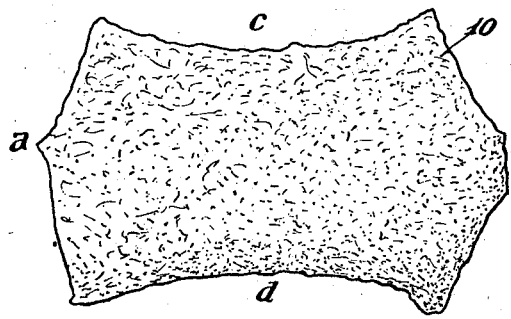
Figure 1 is a plan view of a leather as it is obtained from the tanner.

In carrying out my invention, I first place the leather, which is already tanned, on a supporting medium which will permit the leather to be stretched sufficiently in any predetermined or desired direction, leaving the leather surface smooth and in a proper condition for receiving the cloth. A preferred arrangement is to use a hard adhering surface such as glass. The leather stretched thereon quickly stretches itself into a substantially flat and unwrinkled surface and adheres thereto.

The cement used to bond the leather and cloth should be free of fillers or foreign matter which would cause it to become stiff or hardened when dry. A further important requirement of the cement is that it should be porous so that when the final product is used for wearing apparel, it will not be impervious to vapors and the atmosphere.

The cement is sprayed onto the stretched leather through a fine nozzle. I have obtained satisfactory results with a $\frac{1}{32}''$ nozzle, and a pressure of 45 pounds per square inch. The cement is uniformly distributed on the surface of the leather in a very thin film. The globules of the cement are atomized so that they are substantially of the size of the grain of the leather used. The fabric is then spread onto the sprayed leather to form a smooth layer thereon. When the cement dries, a firm unitary structure is had which is substantially unaffected by the presence of the cement which bonds the fabric to the leather. The cement remains soft and pliable; after drying the product may be used for wearing apparel and the like where porosity is necessary.

Leather bonded with cloth according to my invention eliminates the necessity for separately preparing a lining in leather wearing apparel when such a lining is desired either for warmth or appearance. A further advantage is that the leather maintaining its soft feel, is strengthened by the fabric resulting in an apparel of greater wearing qualities. The manufacture of lined wearing apparel is accordingly simplified since only single cutting and sewing operations are required.

The exodermis which has heretofore been considered as useless for apparel or other articles requiring strength may be strengthened by cementing fabric to it in the above-described manner. The skins are processed and tanned in a well known manner before bonding it to the cloth. The resultant product has the pleasant external appearance of leather, as well as the soft feel or "break" due to the layer of leather employed. The fabric reinforces the skivers of sheep skin, goat skin, cow hide buffings or the like producing an article that may be made stronger than leather.

Accordingly, the very weak skins which have heretofore been commercially useless for the manufacture of a variety of wearing apparel which had to be sewn, such as gloves, slippers, coats and the like, are made useful by my present invention. These articles, made of the weak skins, are reinforced by the cloth and have an external appearance and feel of leather, yet are much cheaper to produce. The reinforcing fabric or cloth provides the necessary body and "warmth" to the apparel without requiring any further lining.

The manufacture of gloves may be divided into three classifications, namely the block cutting; the pull-down or American table cutting; or table cutting. The block cutter simply lays a glove die upon the tanned skin and hammers out the glove patterns. There is no stretch or predetermined close-fit to these gloves; it is the cheapest method of glove making.

In the pull-down or American table cutting method, the whole skin is stretched and the pattern for a number of gloves is laid thereon. The resultant glove has some stretching quality although the stretch is not predetermined for close fitting as in the better quality gloves. The pull-down method produces a grade of glove intermediate between the block cut and the table cut glove.

The manufacture of gloves by table cutting is comparatively very slow and tedious work. Great skill is required to stretch the leather properly and uniformly so that the finished glove will not bag or draw but stretch to a good fit. It requires good judgment to estimate the stretching power of the particular leather used, and only a first class worker is able to determine this exactly.

It is impossible to obtain leather with any predetermined percentage of stretch since leather comes from a living animal and there are no two animals alike. Animals inhabiting different localities never have the same type of skin; animals inhabiting mountain regions having much stronger and tougher skins than the same kind of animal living in valleys. The skins of animals in mountain regions accordingly stretch less than the skins of animals from valleys. A skilled cutter examines the skin to be cut to determine the "allowance" necessary for producing a glove of a particular size.

The manufacture of gloves in accordance with my present invention results in gloves having a predetermined close fit comparable with gloves made by the table cutting process. My process is quick and simple, and requires no skilled operation. In order to more clearly illustrate my invention, I shall first describe in detail in connection with Figures 1 to 6, the table cutting process for manufacturing gloves.

Figure 2:
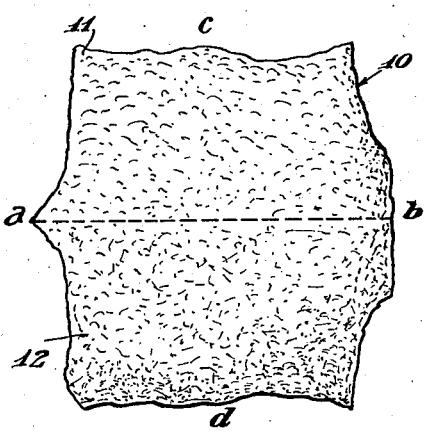
Figure 2 is a plan view of the leather in the first stage of the table cutting process.
Figure 3:
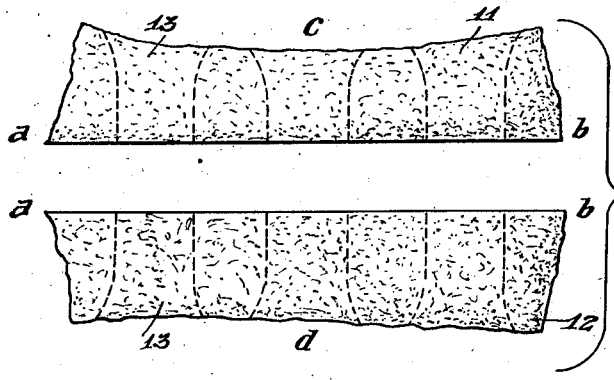
Figure 3 shows the second stage of table cutting, in which the leather has been stretched prior to cutting out the tranks.
Figure 4:
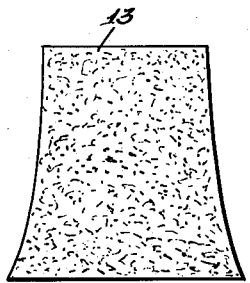
Figure 4 shows the trank.
Figure 5:
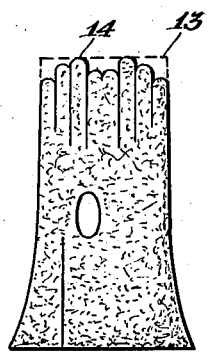
Figure 5 shows the trank stretched into the proper length for a glove, and the glove pattern thereon.

Figure 1 illustrates the form of a processed and tanned skin 10 to be used for producing gloves by the table cutting method. The skin 10 is first uniformly stretched crosswise, increasing the dimensions between sides c—d, producing the shape illustrated in Figure 2. The skin 10 of Figure 2 is then cut in half along the line a—b. Each half 11 and 12 is then uniformly stretched lengthwise (along a—b) to the utmost as illustrated in Figure 3. The tranks 13 are then laid out, the dotted lines of Figure 3 indicating tranks for three pairs of gloves. Figure 4 is an enlarged view of the trank 13 after being cut from the skin. The trank 13 is then stretched lengthwise across the glove so that the completed glove will have a predetermined length. The trank is cut to the proper pattern 14 as seen in Figure 5 so that the completed glove will have the proper stretch for a snug fit. Figure 6 illustrates the distribution of the skin 10 into the various parts that go into the construction of three pairs of gloves, namely the tranks 13, thumbs 15 and fourchettes 16. It is the general practice to cut the thumbs, fourchettes, quirks and other parts which are necessary for a particular glove from the same skin in order to match the texture, color and quality closely.

If the leather had a predetermined stretch, no skilled inspection of the material would be necessary to produce quality gloves. I have found that practically all glove leather may be tanned so that it may stretch from 40 to 60 percent in either direction. In other words, if the skin 10 of Figure 1 would be uniformly stretched crosswise (along c—d) as much as possible, so that it would appear as illustrated in Figure 2, the lengthwise dimension, namely a—b of Figure 2, may be increased 40 to 60 per cent if the skin then is uniformly stretched lengthwise.

It is well known in the textile art that cloth may be woven so that it may be stretched lengthwise or crosswise any predetermined degree. Accordingly, in carrying out my invention, I use a material woven so that it has zero lengthwise stretch and a 35 percent crosswise stretch. This material illustrated as 17 in Figure 7 is cemented to the skin 10 in a manner hereinabove described. The skin 10 is first stretched to the utmost crosswise (along c—d) before being cemented to the cloth. The cement preferably of the characteristics stated above, is then sprayed upon the inside surface of the leather, and the cloth 17 is evenly spread thereon resulting in the product illustrated in Figure 7. Since the skin or leather 10 may be stretched 40 to 60 per cent lengthwise (along a—b), but since the cloth 17 to which it is now bonded can only stretch 35 percent along that dimension, the completed product cannot therefore be stretched more than 35 percent. It is therefore evident that the cloth cemented to the leather will control the stretching of the combination. The stretch of the leather for the glove manufacturer is accordingly predetermined and under perfect control. The cutter's work for producing quality gloves is comparatively simple according to my invention. He merely lays out the pattern on the leather as indicated by the dotted outlines in Figure 7 and then cuts out the tranks 13, thumbs 15 and fourchettes 16.

No examination or judgment for the stretching qualities is necessary, eliminating the skill necessary in present table cutting glove production. An inexperienced man may in a very short time be taught to cut quality gloves according to my invention. The method is far cheaper than the present table cutting method, and the cutter requires only about one-tenth of the time to cut the gloves.

Figure 9 illustrates a completed glove 18 sewn together from the glove parts, in a manner well known to the glove manufacturing art. A partial section 19 is broken away to show the inner layer 17 of the glove, which layer is the predetermined woven fabric hereinabove described.

The glove 18 will stretch to exactly fit the wearer since its crosswise stretch is predetermined. The cloth which is cemented to the leather serves as a lining, and therefore may be made substantial to afford warmth. The cloth 17 may be designed with attractive patterns and contrasting colors to add to the internal appearance. A woolen cloth may be used together with plain leather to produce a lined glove that is much warmer than a plain leather glove. A silk cloth 17 may be used to control the stretch of the leather and gloves made up from such a combination produces a silk lined glove which is more attractive than an unlined leather glove. The glove according to my invention has the appearance of a lined glove.

The bonding of the leather with the cloth strengthens the leather. Skin skivers or buffings which are too weak to be made into gloves may be reinforced by cloth having a predetermined stretch as hereinbefore described.

Weak leather or skivers generally have a stretch of approximately 10 to 15 percent before tearing. By cementing weak leather to cloth that has a stretch less than the leather, the skivers are prevented from tearing. Gloves may be very cheaply produced from such weak leather or skivers. The cemented cloth prevents tearing and imparts a predetermined stretch thereto. The glove will have an external appearance of leather and if a woolen cloth 17 is used, will provide ample warmth. This method may be carried out to a point whereby very weak skivers can be cemented to cloth that has no stretch at all, thereby strengthening the skivers so that many items may be made therefrom.

A modification of a leather product according to my invention is illustrated in Figure 9. The grain of the leather 10 is cemented to the top 20 of the cloth 17 in a manner already described. Chamois or suede 21 is then cemented to the bottom 22 of the cloth 17. The resultant article will have the appearance and feel of one piece of leather. Cloth 17 of a predetermined stretch will control the over all stretch of the material illustrated in Figure 9. A glove or other stretchable article may be readily made up therefrom.

Although I have described several modifications for cementing leather to cloth and have described the use of the resultant product for the manufacture of gloves, further modifications will be evident to those skilled in the art. I do not wish to be limited, for example, to the application of the combined leather and cloth material to the manufacture of gloves or wearing apparel, except as set forth in the following claims.

I claim:

1. The method of manufacturing composite materials which comprises stretching a leather in one direction, spraying a cement thereon so that the cement globules are substantially equal in size to the solid part of the leather and do not block the openings in said leather, and applying to said cement coated leather a fabric, the leather, cement and fabric being so positioned that the composite material is pervious to air.

2. As an article of manufacture a composite material comprising a layer of leather and a fabric united by a layer of cement, said cement consisting of spaced particles permitting passage of air therethrough.

3. As an article of manufacture, a composite material comprising a layer comprising skiver and a fabric united by a layer of cement, said cement consisting of spaced particles permitting passage of air therethrough.

4. As an article of manufacture a composite material comprising a layer of leather and a fabric united by a layer of cement, said cement consisting of spaced particles permitting passage of air therethrough, the composite having a substantial stretch in one direction only.

5. As an article of manufacture a composite material comprising a layer of leather and a layer of fibrous material united by a layer of cement, said cement consisting of spaced particles covering the solid part of the leather but not substantially blocking the openings in the leather, said composite of leather, cement and fibrous material being air pervious.

6. The method of manufacturing a composite material comprising tanned leather and a fibrous backing, which comprises stretching the tanned leather in one direction, smoothing the tanned leather on to a hard adhering supporting surface so as to present a substantially unwrinkled leather surface to which the fibrous backing is to be joined, applying a cement and a fibrous backing thereto so that the cement does not block the openings in the leather, the leather and cement and fibrous backing being so positioned that the composite of leather, cement and fibrous material is pervious to the air.

HIMEN COOPER.